US012366695B2

(12) United States Patent
Cornellisen et al.

(10) Patent No.: US 12,366,695 B2
(45) Date of Patent: Jul. 22, 2025

(54) LASER-BASED LIGHT ENGINE WITH IMPROVED THERMAL MANAGEMENT USING TAPERED FIBER

(71) Applicant: SIGNIFY HOLDING B.V., Eindhoven (NL)

(72) Inventors: Hugo Johan Cornellisen, Escharen (NL); Marc Van Der Schans, Eindhoven (NL); Olexandr Valentynovych Vdovin, Maarheeze (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/565,178

(22) PCT Filed: May 30, 2022

(86) PCT No.: PCT/EP2022/064527
§ 371 (c)(1),
(2) Date: Nov. 29, 2023

(87) PCT Pub. No.: WO2022/253725
PCT Pub. Date: Dec. 8, 2022

(65) Prior Publication Data
US 2024/0255685 A1 Aug. 1, 2024

(30) Foreign Application Priority Data
Jun. 1, 2021 (EP) .................................... 21177039

(51) Int. Cl.
*F21V 8/00* (2006.01)
*F21V 9/32* (2018.01)
*F21V 29/505* (2015.01)
*F21Y 115/10* (2016.01)

(52) U.S. Cl.
CPC .............. *G02B 6/0003* (2013.01); *F21V 9/32* (2018.02); *F21V 29/505* (2015.01); *G02B 6/001* (2013.01); *F21Y 2115/10* (2016.08)

(58) Field of Classification Search
CPC ..... G02B 6/001; G02B 6/0003; F21V 29/505; F21V 9/32
See application file for complete search history.

(56) References Cited

U.S. PATENT DOCUMENTS

| 2008/0198603 A1* | 8/2008 | Sormani | .................... F21K 9/00 |
| | | | 362/296.07 |
| 2011/0032724 A1* | 2/2011 | Kinoshita | .......... G02B 27/0966 |
| | | | 362/555 |

(Continued)

FOREIGN PATENT DOCUMENTS

| WO | 2015074867 A1 | 5/2015 |
| WO | 2015113979 A1 | 8/2015 |
| WO | 2020078790 A1 | 4/2020 |

*Primary Examiner* — Abdulmajeed Aziz
*Assistant Examiner* — Nathaniel J Lee

(57) ABSTRACT

The invention provides a light conversion system (1000) comprising (a) one or more luminescent bodies (210), (b) a thermally conductive body (400), (c) a waveguide element (500), and (d) a light generating device (100), wherein: (A) the thermally conductive body (400) comprises a first reflective face (401), and a first slit (420) in at least part of the first reflective face (401), wherein the first slit (420) comprises a first slit opening (421); (B) the waveguide element (500) comprises a light entrance part (501) and a light exit part (502), wherein at least part of the light exit part (502) is configured in the first slit (420); wherein the waveguide element (500) is configured to guide at least part of first light (101) coupled into the waveguide element (500) via the light entrance part (501) to the light exit part (502); (C) the one or more luminescent bodies (210) comprise a reflector-directed part (211) and an optical output part (212); wherein (Continued)

the reflector-directed part (211) is in thermal contact with at least part of the first reflective face (401) and wherein the reflector-directed part (211) encloses at least part of the first slit opening (421); wherein the one or more luminescent bodies (210) are configured (a) to receive via at least part of the reflector-directed part (211) at least part of the first light (101) escaping from the light exit part (502) of the waveguide element (500) and (b) to convert in a light conversion process at least part of the first light (101) into luminescent material light (201), wherein at least part of the luminescent material light (201) emanates from the optical output part (212); and (D) the light generating device (100) is configured to generate the first light (101), wherein the light generating device (100) is configured upstream of the light entrance part (501) of the waveguide element (500); and wherein the light generating device (100) comprises a solid state light source.

14 Claims, 7 Drawing Sheets

(56) References Cited

U.S. PATENT DOCUMENTS

| | | | |
|---|---|---|---|
| 2011/0215701 A1* | 9/2011 | Tong | F21K 9/64 |
| | | | 313/46 |
| 2018/0066810 A1 | 3/2018 | Lentine et al. | |
| 2019/0032886 A1 | 1/2019 | Daicho et al. | |

\* cited by examiner

LASER-BASED LIGHT ENGINE WITH IMPROVED THERMAL MANAGEMENT USING TAPERED FIBER

CROSS-REFERENCE TO PRIOR APPLICATIONS

This application is the U.S. National Phase application under 35 U.S.C. § 371 of International Application No. PCT/EP2022/064527, filed on May 30, 2022, which claims the benefit of European Patent application Ser. No. 21/177,039.1, filed on Jun. 1, 2021. These applications are hereby incorporated by reference herein.

FIELD OF THE INVENTION

The invention relates to a light conversion system and to a light generating device comprising such light conversion system.

BACKGROUND OF THE INVENTION

Light apparatuses including a light source generating a blue-colored light, a phosphorus filter transforming the blue-colored light into white light, are known in the art. US2018066810, for instance, describes light apparatuses including a light source generating a blue-colored light, a phosphorus filter transforming the blue-colored light into white light, and a light dispersing element receiving the light and projecting a plurality of discrete points of light onto a target surface that have been transformed into white light by the phosphorus filter. US2018066810 also describes methods for creating a plurality of discrete points of light on a target surface using a light apparatus including a light source and a phosphorus filter and a light dispersing element, including generating a light using the light source, in which the generated light is blue-colored light, transforming the light into white light by passing the light through a phosphorus filter, and causing the light to be incident on the light dispersing element, such that the light dispersing element disperses the light and creates a plurality of individual points of light on the target surface.

SUMMARY OF THE INVENTION

While white LED sources can give an intensity of e.g. up to about 300 lm/mm$^2$; static phosphor converted laser white sources can give an intensity even up to about 20.000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

One of the problems that may be associated with such (laser) light sources is the heat management of the (ceramic) phosphor. Other problems associated with such laser light sources may be the desire to create compact high-power devices.

Hence, it is an aspect of the invention to provide an alternative luminescent element, which preferably further at least partly obviates one or more of above-described drawbacks. The present invention may have as object to overcome or ameliorate at least one of the disadvantages of the prior art, or to provide a useful alternative.

In an aspect, the invention provides a light conversion system ("system") comprising (a) one or more luminescent bodies, (b) a thermally conductive body, and (c) a waveguide element. In embodiments, the thermally conductive body may comprise a first reflective face. Further, especially the thermally conductive body comprises a first slit in at least part of the first reflective face. Further, the first slit may comprise a first slit opening. Further, in embodiments the waveguide element may comprise a light entrance part and a light exit part. Especially, at least part of the light exit part may be configured in the first slit. Further, in embodiments the waveguide element may be configured to guide at least part of first light (coupled into the waveguide element via the light entrance part) to the light exit part. In embodiments, the one or more luminescent bodies may comprise a reflector-directed part and an optical output part. Especially, in embodiments the reflector-directed part may be (configured) in thermal contact with at least part of the first reflective face. Further, in embodiments the reflector-directed part may enclose at least part of the first slit opening. In embodiments, the one or more luminescent bodies may be configured (a) to receive via at least part of the reflector-directed part at least part of the first light (escaping from the light exit part of the waveguide element). The one or more luminescent bodies may (further) be configured (b) to convert in a light conversion process at least part of the first light into luminescent material light. At least part of the luminescent material light may (thereby) emanate from the optical output part. Further, in specific embodiments the light conversion system may comprise (d) a light generating device. In specific embodiments, the light generating device may be configured to generate the first light. Further, in embodiments the light generating device may be configured upstream of the light entrance part of the waveguide element. Especially, in embodiments the light generating device may comprise a solid-state light source. Hence, especially the invention provides in embodiments a light conversion system comprising (a) one or more luminescent bodies, (b) a thermally conductive body, (c) a waveguide element, and optionally (d) a light generating device, wherein: (A) the thermally conductive body comprises a first reflective face, and a first slit in at least part of the first reflective face, wherein the first slit comprises a first slit opening; (B) the waveguide element comprises a light entrance part and a light exit part, wherein at least part of the light exit part may be configured in the first slit; wherein the waveguide element is configured to guide at least part of first light coupled into the waveguide element via the light entrance part to the light exit part; (C) the one or more luminescent bodies comprise a reflector-directed part and an optical output part; wherein the reflector-directed part is in thermal contact with at least part of the first reflective face and wherein the reflector-directed part encloses at least part of the first slit opening; wherein the one or more luminescent bodies are configured (a) to receive via at least part of the reflector-directed part at least part of the first light escaping from the light exit part of the waveguide element and (b) to convert in a light conversion process at least part of the first light into luminescent material light, wherein at least part of the luminescent material light emanates from the optical output part; and (D) the (optional) light generating device is configured to generate the first light, wherein the light generating device is configured upstream of the light entrance part of the waveguide element; and wherein the light generating device comprises a solid state light source.

With such system, efficiency may be relatively high as a large area of the luminescent body may be in thermal contact with a thermally conductive material, such as a heatsink. Further, a relatively small device may be provided which may be able to provide light with a relatively high intensity. The present invention may provide a compact transmissive configuration, having efficient collection optics for light from the frontside and the backside, with improved heat removal from the phosphor, comparable to a reflective configuration.

As indicated above, the light conversion system may comprise (a) one or more luminescent bodies, (b) a thermally conductive body, and (c) a waveguide element. Further, in specific embodiments the system may comprise (d) a light generating device.

Especially, the thermally conductive body may be applied for dissipating heat from one or more of (i) the light generating device, (ii) the light guiding element, and (iii) at least one of the one or more luminescent bodies. More especially, the thermally conductive body may be applied for dissipating heat from at least one of the one or more luminescent bodies.

The thermally conductive body may comprise thermally conductive material. Especially, the thermally conductive body may consist of thermally conductive material.

A thermally conductive material may especially have a thermal conductivity of at least about 20 W/(m*K), like at least about 30 W/(m*K), such as at least about 100 W/(m*K), like especially at least about 200 W/(m*K). In yet further specific embodiments, a thermally conductive material may especially have a thermal conductivity of at least about 10 W/(m*K). In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide. In specific embodiments, the thermally conductive body may comprise one or more of a copper body and an aluminum body. In specific embodiments, the thermally conductive body may comprise one or more of a heat sink and a heat spreader.

Heatsinks are known in the art. The term "heatsink" (or heat sink) may especially be a passive heat exchanger that transfers the heat generated by device, such as an electronic device or a mechanical device, to a fluid (cooling) medium, often air or a liquid coolant. Thereby, the heat is (at least partially) dissipated away from the device. A heat sink is especially designed to maximize its surface area in contact with the fluid cooling medium surrounding it. Hence, especially a heatsink may comprise a plurality of fins. For instance, the heatsink may be a body with a plurality of fins extending thereof. A heatsink especially comprises (more especially consists of) a thermally conductive material. The term "heatsink" may also refer to a plurality of (different) heatsinks.

Heat spreaders are known in the art. A heat spreader may be configured to transfer energy as heat from a first element to a second element. The second element may especially be a heatsink or heat exchanger. A heat spreader may passive or active. Embodiments of passive heat spreaders may comprise a plate or block of material having high thermal conductivity, such as copper, aluminum, or diamond. An active heat spreader may be configured to speed up heat transfer with expenditure of energy as work supplied by an external source. Herein, the heat spreader may especially be a passive heat spreader. Alternatively or additionally, the heat spreader may be an active heat spreader, such as selected from the group of heat pipes and vapor chambers. A heat spreader especially comprises (more especially consists of) a thermally conductive material. The term "heat spreader" may also refer to a plurality of (different) heat spreaders.

The thermally conductive body may be configured in thermal contact with one or more of (i) the light generating device, (ii) the light guiding element, and (iii) at least one of the one or more luminescent bodies.

An element may be considered in thermal contact with another element if it can exchange energy through the process of heat. Hence, the elements may be thermally coupled. In embodiments, thermal contact can be achieved by physical contact. In embodiments, thermal contact may be achieved via a thermally conductive material, such as a thermally conductive glue (or thermally conductive adhesive). Thermal contact may also be achieved between two elements when the two elements are arranged relative to each other at a distance of equal to or less than about 10 μm, though larger distances, such as up to 100 μm may be possible. The shorter the distance, the better the thermal contact. Especially, the distance is 10 μm or less, such as 5 μm or less. The distance may be the distanced between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments in average the distance between the two elements may be 10 μm or less (though larger average distances may be possible, such as up to 100 μm). In embodiments, the two surfaces of the two elements may be kept at a distance with one or more distance holders.

Especially, the light guiding element and/or at least one of the one or more luminescent bodies may be configured in physical contact with the thermally conductive body and/or a reflective surface thereof.

In embodiments, the thermally conductive body may comprise a first reflective face. This may e.g. be the case when the thermally conductive body comprises a metal as thermally conductive material, like Al or Cu. However, when the thermally conductive material is not reflective, or not reflective enough, a reflective coating, such as an Al coating, a silver coating, or an Al and Ag coating, may be available on at least part of the surface of the thermally conductive material. Alternatively or additional coatings may also be possible, such as an (additional) dielectric thin film coating to enhance reflectivity. In these ways, a thermally conductive body may be provided comprising a first reflective face. The term "reflective face" may also refer to two or more reflective faces. Further, here the term "reflective" especially refers to optical reflective for one or more of the luminescent material light (see below) and the first light (see (also) below). Especially, the terms "reflective" and "reflectivity", and similar terms, herein, may refer to a reflectivity of at least 80%, even more especially at least 90%, yet even more especially at least 95%, such as at least about 98%, under perpendicular irradiation with the radiation for which the item or face, etc., like the first reflective face, is reflective. Especially, the radiation may be one or more of the luminescent material light and the first light, more especially both.

Further, especially the reflectivity of the first face is essentially specular reflective. Hence, under perpendicular irradiation, at least 90% of the radiation may specularly be reflected. However, in other embodiments the reflectivity of the first face is essentially diffuse reflective. In specific embodiments, a silver sinter thermal interface material can be applied in between the converter and the thermally conductive material, such as a heatsink, with the interface material having both reflective and thermal transfer functions. Hence, under perpendicular irradiation, at least 90% of the radiation may diffusively be reflected (by the first reflective face). Therefore, in specific embodiments under perpendicular irradiation, at least 90% of the radiation may specularly or diffusively be reflected.

The thermally conductive body may further comprise a slit (indicated as "first slit" in at least part of the first reflective face. The slit may in embodiments be a trench in the first reflective face. Hence, the slit may be a recess in the thermally conductive body. Especially, the first slit may be elongated, with a slit length (L2; see also below) larger than a cross-sectional dimension of the slit. Hence, the slit may comprise an axis of elongation.

The slit may in embodiments have a rectangular cross-section. In other embodiments, the slit may have a semi-circular cross-section. In embodiments, the slit may have a triangular cross-section. The slit may in embodiment have rounded edges. For instance, in embodiments the slit may have a rectangular cross-section with rounded edges.

The slit may comprise one or more slit faces. Assuming a semi-circular cross-section. The slit may be defined by at least a single slit face. Assuming a rectangular cross-section, the slit may be defined by at least three slit faces. As can be derived from the above, especially the one or more slit faces are reflective slit faces (reflective for the first light and/or the luminescent material light, more especially both).

Further, the slit may have a length equal to a (relevant) dimension of the thermally conductive body. In such embodiments, the slit may not have an end face. In other embodiments, the slit may have a length smaller than a (relevant) dimension of the thermally conductive body. In such embodiments, the slit may (also) have an end face.

Especially, the faces are defined by the thermally conductive body. Optionally, in embodiments the faces of the slit may be defined by a reflective coating on thermally conductive material. In this way, the slit may be defined by reflective faces.

The slit may have a top opening, herein also indicated as "first slit opening". Hence, the first slit comprises a first slit opening. The slit may also comprise a second opening, indicated as "second slit opening". Would the slit have a length equal to a (relevant) dimension of the thermally conductive body, the slit may comprise two second openings (configured at both ends of the slit). With reference to the axis of elongation, the slit may in embodiments have a first slit opening parallel to the axis of elongation and one or two second openings perpendicular to the axis of elongation. The first slit opening(s) may define (a) slit end(s). Hence, the waveguide element may in embodiments penetrate the thermally conductive body via the second slit opening.

The slit may especially be used for providing excitation light or first light at one side of the one or more luminescent bodies, while these bodies may also be in thermal contact with the thermally conductive body, at the side where the excitation light is provided. The use of a slit, instead of e.g. a pinhole, may also allow a larger irradiation area of the one or more luminescent bodies.

To obtain the first light in the slit, a waveguide element is applied. The waveguide element is at least partly configured in the slit and may also be partly configured external from the slit. The former part may comprise a light exit part, where first light may escape from the waveguide element, and the latter part may comprise a light entrance part, where first light may be coupled into the waveguide element. Hence, in embodiments the waveguide element may comprise a light entrance part and a light exit part, wherein at least part of the light exit part is configured in the first slit. Further, the waveguide element may (thus) be configured to guide at least part of first light coupled into the waveguide element via the light entrance part to the light exit part.

The waveguide element especially comprises a light transmissive material, like glass or quartz or light transmissive polymeric material, such as e.g. PMMA, though other materials may also be possible, like e.g. PC. In specific embodiments, the waveguide element may comprise glass material. In specific embodiments, the waveguide element may comprise quartz. In other specific embodiments, the waveguide element may comprise silicone. The light transmissive material is especially light transmissive for the first light. The waveguide element may comprise a fiber (waveguide fiber). The waveguide element may be relatively short, such as in the order of 0.1-10 mm, as the light conversion system may be a relatively compact system. The transmissivity for the first light may be at least 80%/cm, such as at least 90%/cm, even more especially at least 95%/cm, such as at least 98%/cm, such as at least 99%/cm. Instead of the term "waveguide" also the term "lightguide" may be applied. Hence, in specific embodiments the waveguide element comprises an optical fiber.

In embodiments, the waveguide element may comprise over at least part of its length a cladding. For instance, over essential the entire length, except for the light exit part, the waveguide element may in embodiments comprise a cladding. Hence, in embodiments the waveguide may comprise a core and a cladding.

Further, the system comprises at least one luminescent body. The luminescent body may especially comprise a luminescent material, that is configured to convert light (herein especially first light) into luminescent material light.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium, especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq0.1$, and wherein $0\leq y2\leq0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein $x1+x2+x3=1$, wherein $x3>0$, wherein $0<x2+x3\leq0.2$, wherein $y1+y2=1$, wherein $0\leq y2<0.2$. Especially, x3 is selected from the range of 0.001-0.1. Note that in embodiments $x2=0$. Alternatively or additionally, in embodiments $y2=0$.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $M_2Si_5N_8$:$Eu^{2+}$ and/or $MAlSiN_3:Eu^{2+}$ and/or $Ca_2AlSi_3O_2N_5:Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})$AlSiN$_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^2$). For instance, assuming 2% Eu in CaAlSiN$_3$:Eu, the correct formula could be $(Ca_{0.98}Eu_{0.02})$AlSiN$_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2$Si$_5$N$_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_7$:$Eu^{2+}$), or similar compounds.

The term "luminescent material" herein especially relates to inorganic luminescent materials.

Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

In embodiments the luminescent body may be a crystalline body, or a ceramic body, or a luminescent material dispersed in another material, like e.g. a polymeric body (see further also below).

In specific embodiments, at least one of the one or more luminescent bodies comprises a ceramic body. Further, in embodiments at least one of the one or more luminescent bodies comprises (a) a luminescent material of the type $A_3B_5O_{12}$:Ce, wherein A comprises one or more of Y, La, Gd, Tb and Lu, and wherein B comprises one or more of Al, Ga, In and Sc, and/or (b) a luminescent material of the type $A_3Si_6N_{11}$:$Ce^{3+}$, wherein A comprises one or more of Y, La, Gd, Tb and Lu. especially wherein A comprises one or more of La and Y.

Further, in embodiments the one or more luminescent bodies are a single luminescent body. Hence, the system may comprise a single luminescent body.

The luminescent body is especially configured to receive at least part of the first light. Hence, in embodiments the luminescent body is configured downstream of the (optional) light generating device. Further, the luminescent body may especially be configured in a light receiving relationship with the light generating device.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream". The terms "radiationally coupled" or "optically coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material.

In embodiments, the luminescent body ("body") may have lateral dimensions, like width or length (W1 or L1) or diameter (D), and a thickness or height (H1). In embodiments, (i) D≥H1 or (ii) and W1≥H1 and/or L1≥H1. The luminescent body may be transparent or light scattering. In specific embodiments, L1<10 mm, such as especially L1≤5 mm, more especially L1≤3 mm, most especially L1≤2 mm. In specific embodiments, W1≤10 mm, such as especially W1≤5 mm, more especially W1≤3 mm, most especially W1≤2 mm. In specific embodiments, H1<10 mm, such as especially H1≤5 mm, more especially H1≤3 mm, most especially H1≤2 mm. In specific embodiments, D≤10 mm, such as especially D≤5 mm, more especially D≤3 mm, most especially D≤2 mm. In specific embodiments, the body may have in embodiments a thickness in the range 50 µm-1 mm. Further, the body may have lateral dimensions (width/diameter) in the range 100 µm-10 mm. In yet further specific embodiments, (i) D>H1 or (ii) W1>H1 and W1>H1. Especially, the lateral dimensions like length, width, and diameter are at least 2 times, like at least 5 times, larger than the height. In specific embodiments, the luminescent body has a first length L1, a first height H1, and a first width W1, wherein H1≤0.5*L1 and H1≤0.5*W1. Hence, the luminescent body may have a tile shape. The luminescent body may have a rectangular cross-section or a circular cross-section, though other cross-sections may also be possible.

The one or more luminescent bodies may form a body having planar faces, with adjacent faces perpendicular configured relative to one another. In other embodiments, the one or more luminescent bodies may form a body with one or more curved faces and one or more planar faces, like e.g. a spherical cap-shaped body. When the one or more luminescent bodies form a body comprising a second slit, especially the second slit is a recess in an essentially planar face (which likewise may be the case for the first slit, in an essentially planer first reflective face).

In embodiments, one of the faces of the luminescent body may comprise the reflector-directed part, another one of the faces of the luminescent body may comprise the optical output part 212. The one or more other available faces of the luminescent body may in specific embodiments be provided with a reflector, such as a reflective layer. For instance, in embodiments, a luminescent body may have the shape of a disk, with one face being the reflector-directed part, the opposite face being the optical output part, and a face bridging the two opposite faces being provided with a reflective coating. In another example, in embodiments, a luminescent body may have the shape of a tile, with one face being the reflector-directed part, the opposite face being the optical output part, and four faces bridging the two opposite faces being provided with a reflective coating. Likewise this may apply to luminescent bodies having cross-sections other than circular or rectangular.

Therefore, in specific embodiments the one or more luminescent bodies may comprise a reflector-directed part, an optical output part 212, and third part where light may effectively not escape from the luminescent body due to the presence of a reflective coating on the luminescent body. Possible reflective coatings may also be those described in relation to the optional reflective coating on the thermally conductive body, and those described below, such as e.g. white diffuse scattering materials, e.g. white ceramics or reflective compositions of particles in (silicone) matrix) (see also below).

As indicated above, the luminescent body may especially comprise a luminescent material, that is configured to convert light (herein especially first light) into luminescent material light. Due to the conversion process, heat may be generated. To this end, the thermally conductive body may be used to dissipate at least part of the heat. Especially, part of the one or more luminescent bodies that are directed to the thermally conductive body may in thermal contact with the thermally conductive body. More especially, in embodiments the reflector-directed part (see also below) may be (configured) in thermal contact with at least part of the first reflective face.

Further, due to the conversion process luminescent material light is generated, of which at least part may propagate in the direction of the thermally conductive body. Hence, especially the part of the thermally conductive body that may receive luminescent material light (that escapes from the one or more luminescent bodies) may be reflective, to reflect at least part of this luminescent material light back into the one or more luminescent bodies. The part of the one or more luminescent bodies from which light may escape in the direction of the thermally conductive body, may be indicated as reflector-directed part.

This reflector-directed part may enclose at least part of the first slit opening. For instance, the reflector-directed part may close the first slit opening, or at least part thereof. In alternative embodiment, part of the reflector-directed part may be over the first slit opening. Hence, in specific embodiments the reflector-directed part may close at least part of the first slit opening.

Especially, in embodiments the first reflective face may especially be planar, except for the first slit. At least part of the one or more luminescent bodies may be in thermal contact with the planar part of the first reflective face and at least part of the one or more luminescent bodies may close the first slit or be configured over the first slit. Hence, the reflector-directed part may enclose at least part of the first slit opening.

In operation, first light may be introduced via the light entrance part of the waveguide element, propagate through the waveguide element, exit from the waveguide element at the light exit part configured in the first slit, and enter the one or more luminescent bodies. Hence, the one or more luminescent bodies may receive via at least part of the reflector-directed part at least part of the first light escaping from the light exit part of the waveguide element. Upon conversion, part of the luminescent material light may escape from the one or more luminescent body and escape from the system as system light. Hence, in an operational mode of the system, the system light may comprise at least part of the luminescent material light. The part of the one or more luminescent bodies where luminescent material light escapes (of which at least part may downstream be comprised by the system light) may be indicated as the optical output part. Especially, the term "optical output part" may refer to that part of the one or more luminescent bodies from which luminescent material light may escape and emanate away from the system as system light. Instead of the term "optical output part" also the term "functional optical output part" may be applied.

Therefore, the one or more luminescent bodies may comprise a reflector-directed part and an optical output part. Especially, the reflector-directed part may be in thermal contact with at least part of the first reflective face, like in physical contact. Further, especially the reflector-directed part encloses at least part of the first slit opening. Yet, especially the one or more luminescent bodies may be configured (a) to receive via at least part of the reflector-directed part at least part of the first light escaping from the light exit part of the waveguide element and (b) to convert in a light conversion process at least part of the first light into luminescent material light. Especially, at least part of the luminescent material light may (thus) emanate from the optical output part.

The invention is directed in an aspect to the light conversion system without light generating device, and in another aspect to the light conversion system including the light generating device.

As indicated above, the light generating device may be configured to generate the first light, wherein the light generating device is configured upstream of the light entrance part of the waveguide element. The light generating device may comprise a light source, especially a solid-state light source.

The term "light source" may in principle relate to any light source known in the art. It may be a conventional (tungsten) light bulb, a low-pressure mercury lamp, a high-pressure mercury lamp, a fluorescent lamp, a LED (light emissive diode). In a specific embodiment, the light source comprises a solid-state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi-LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi-LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode.

The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid-state light as such, like a blue LED, is a light source. A combination of a solid-state light source (as light generating element) and a light converter element, such as a blue LED and a light converter element, optically coupled to the solid state light source, may also be a light source. Hence, a white LED is a light source.

The term "light source" herein may also refer to a light source comprising a solid-state light source, such as an LED or a laser diode or a superluminescent diode. The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:CaF$_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:YCa$_4$O(BO$_3$)$_3$ or Nd:YCOB, neodymium doped yttrium orthovanadate (Nd:YVO$_4$) laser, neodymium glass (Nd:glass) laser, neodymium YLF (Nd:YLF) solid-state laser, promethium 147 doped phosphate glass (147Pm$^{3+}$:glass) solid-state laser, ruby laser (Al$_2$O$_3$:Cr$^{3+}$), thulium YAG (Tm:YAG) laser, titanium sapphire (Ti:sapphire; Al$_2$O$_3$:Ti$^{3+}$) laser, trivalent uranium doped calcium fluoride (U:CaF$_2$) solid-state laser, Ytterbium doped glass laser (rod, plate/chip, and fiber), Ytterbium YAG (Yb:YAG) laser, Yb$_2$O$_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments $\leq 2°$ (FWHM), more especially $\leq 1°$ (FWHM), most especially $\leq 0.5°$ (FWHM). Hence, $\leq 2°$ (FWHM) may be considered (highly) collimated light source light. Optics may be used to provide (high) collimation (see also above).

In embodiments, the light generating device may comprise a solid-state light source. In specific embodiments, the light source may be selected from the group of laser diodes and superluminescent diodes. In other embodiments, the light source may comprise an LED.

In embodiments, the waveguide element may comprise a tapering part. Especially, at least part of the tapering part may be configured in the first slit. The tapering part may allow escape from first light of the waveguide element. Hence, the tapering part may comprise the light exit part, or the light exit part may comprise the tapering part. The use of a tapering part may also allow a relatively broad light exit part. This may be desirable in view of a substantially even irradiation of the one or more first luminescent bodies with the first light. Alternatively, the tapering part may be used to "squeeze" the first light to a part of the waveguide element where the first light may escape therefrom, such as a tip.

Alternatively or additionally, due to the tapering essentially total internal reflection is not possible anymore, and light may escape from the tapering part. Especially, the tapering is in a direction from external from the first slit to a position in the first slit. Therefore, in embodiments the waveguide element may comprise a tapering part, wherein the tapering of the tapering part is in a direction from external from the first slit to a position in the first slit, wherein the light exit part is comprised by the tapering part or is configured downstream of the tapering part.

As indicated above, at least part of the waveguide element may be configured in the slit. The tapering of the waveguide element may start in the slit. However, the tapering of the waveguide element may also already start external from the slit. It appears that the latter may have beneficial effects. Hence, in specific embodiments the tapering of the tapering part has an onset external from the first slit. For instance, a plurality of reflections in the tapering part may be required to pass the total internal reflection angle and escape from the waveguide element. For this reason, it is not necessary that the entire tapering part is configured in the slit. Assuming e.g. a tapering part having a length L4, then the tapering part may be in the range of 50-100% of the length L4 in the slit, like e.g. 60-95%, like 60-80%. The part of the tapering part that may not be configured in the slit is the relatively broadest part, i.e. the 0-40% of L4 calculated from the onset. Hence, the third length (L3) of the slit-based part may be smaller than the length L4 of the tapering part.

The tapering may be from 100% cross-sectional dimension(s) to 0% cross-sectional dimension(s). Especially, in embodiments the tapering is gradual. In embodiments, the tapering is linear. Instead of or in addition to the tapering, outcoupling of light from the waveguide element may be obtained with light outcoupling structures, like micro-indentations or micro-protrusions.

Hence, in embodiments the cross-sectional shape of the waveguide element may e.g. be square, rectangular, or circular. However, the waveguide element may also have a hexagonal cross-section. Other shapes may also be possible. Further, alternative or in addition to the tapering, the waveguide element may comprise means of light extraction, like e.g. scattering features at the out-coupling side and/or microprismatic extraction features. Therefore, in embodiments the light exit part comprises light outcoupling structures.

Especially, at least 50% (based on an energy scale) of the light that escapes from the waveguide element within the slit, escapes from the light exit part, more especially at least 60%, like at least 75%, or even higher, like at least 80%. More especially, essentially all the light that escapes from the waveguide element within the slit, escapes from the light exit part, such as 95% or more, like at least 99%. Hence, essentially all (device) light that escapes from the waveguide element may escape via the light exit part.

First light that escapes from the light exit part may propagate to the one or more luminescent bodies directly or indirectly. The one or more luminescent bodies may be configured at some distance from the light exit part or may be configured in physical contact with the light exit part. Hence, first light may escape from the light exit part and be coupled into the one or more luminescent body, optionally via propagation through a medium. However, it may also be possible that the first light only enters the one or more luminescent bodies after one or more reflections by one or more reflective slit faces.

It may be desirable that a substantial part (of a face) of the one or more luminescent bodies is illuminated. In other words, it may be desirable that the first light is not focused on a relatively small spot, but may irradiate a substantial part (of a face) of the one or more luminescent bodies. On the other hand, also it may be desirable that at least part of the reflector-directed part is in (direct) thermal contact with the thermally conductive body. Hence, in embodiments a spot of first light on the reflector-directed part of the one or more luminescent bodies, defined by the full width 10% maximum of the intensity of the first light may be in the order of 20-80%, such as in the order of 30-70%, of a total area of the reflector-directed part of the one or more luminescent bodies. Hence, in the order of about 80-20%, such as about 70-30% of the reflector-directed part may be in thermal contact with the thermally conductive body. Note that the term "reflector-directed part" is especially used for that part of the luminescent body that is in thermal contact with the thermally conductive body.

Further, in embodiments the one or more luminescent bodies may have a first length (L1) defined parallel to the first slit, wherein in a projection on the one or more luminescent bodies (at least part of) the light exit part is configured between 20%-80% of the first length (L1).

Especially, in embodiments the device light that escapes from the light exit part may irradiate the luminescent body part that may enclose the slit, relatively evenly. Hence, the device light may be more or less evenly distributed over the length to prevent "hot spots".

As indicated above, the slit may have a length equal to a (relevant) dimension of the thermally conductive body or smaller. The one or more luminescent bodies may have a (relevant) dimension which may be smaller, equal or larger that the slit length, especially equal to or larger. In this way the first slit opening may be enclosed and substantially no light may escape to external from the first slit opening without having to propagate through the one or more luminescent bodies. Here, the term "relevant dimension" may refer to parallel dimensions of adjacent elements. In specific embodiments, the first slit may have a second length (L2), wherein the waveguide element comprises a slit-based part, wherein the slit-based part is configured in the first slit, wherein the slit-based part comprises the light exit part, wherein the slit-based part has a third length (L3), wherein L3<L2. Especially, in embodiments $0.5 \leq L3/L2 \leq 0.9$.

The first slit may have a height that is equal to or larger than the part of the waveguide element that is configured in the first slit. However, it may also be possible that also the one or more luminescent bodies provide a (second) slit, aligned with the first slit, allowing the part of the waveguide element that is configured in the first slit having a height larger than the first slit height. Hence, in embodiments the slit-based part may have a maximum height (H3), wherein the first slit has a slit height (H2), wherein in specific embodiments $0.25 \leq H3/H2 \leq 4$. Note that H3 refers to the maximum height. Due to the possible tapering, the height as such may decrease from the maximum height to a substantially reduced height, or even to zero. As can be derived from the above in specific embodiments H3/H2>1, wherein the one or more luminescent bodies provide a second slit, wherein the first slit and the second slit together host at least part of the slit-based part. In other embodiments, $H3/H2 \leq 1$. Especially, in embodiments $0.5 \leq H3/H2 \leq 1$.

Especially, one part of the external surface of the one or more luminescent bodies may (thus) be directed to the first reflective face of the thermally conductive body. The other part of the external surface of the luminescent bodies may be used as light outcoupling faces for luminescent material light that may emanate away from the one or more luminescent bodies (optionally via reflection at other reflective surfaces, like of a collimator; see also below). Would by way of example the one or more luminescent bodies provide a cube with external surface area 6*A, then the reflector directed part may e.g. in embodiments be 1*A or even up to about 5*A, would the one or more luminescent bodies be configured in a recess in the thermally conductive body. The light emitting part may thus in embodiments be 5*A, in the former embodiments, down to about 1*A in the latter embodiments. In specific embodiments, the reflector-directed part has a first area A1 and the light emitting part has a second area A2, wherein in specific embodiments A2>A1, even more especially $1.25 \leq A2/A1 \leq 4$.

Would the thermally conductive body comprise a recess ("luminescent body recess"), wherein part of the one or more luminescent bodies may be configured, the first slit may be a recess to this (luminescent body) recess.

As indicated above, part of the one or more luminescent bodies may be configured in a recess of the thermally conductive body. However, in such embodiments and in other embodiments, the thermally conductive body may provide a shape having the function of beam shaping the luminescent material light. For instance, the thermally conductive body may provide a (truncated) conical shape, or a (truncated) pyramidal shape, which may be hollow and which may host the one or more luminescent bodies. Such hollow shapes may be used for beam shaping the luminescent material light that emanates from the one or more luminescent bodies. As will be clear from the above, the hollow shape may be defined by reflective (second) faces, especially of thermally conductive material or a reflective coating thereon. Hence, in specific embodiments the thermally conductive body is a shaped body comprising a reflector cavity having a first reflector end and a second reflector end, wherein the reflector cavity comprises a reflector exit configured at the second reflector end, and wherein at least part of the optical output part of the one or more luminescent bodies is configured at the first reflector end. The phrase "configured at the first reflector end", and similar phrases, may especially indicate that the luminescent body (bodies) may be configured closer to the first reflector end than to the second reflector end.

The present invention has above especially been explained in relation to a single first slit hosting a single part of a waveguide element. However, in embodiments two waveguide elements may be applied, each entering a first slit with at both ends (second) openings, via these oppositely configured openings. Alternatively or additionally, the thermally conductive element may comprise two or more first slits. Hence, in embodiments the light conversion system may comprise two or more waveguide elements, wherein the thermally conductive body comprises one or more of the first slits in at least part of the first reflective face, and wherein each first slit hosts one or two light exit parts of one or two respective waveguide elements.

In embodiments, the light conversion system comprises an integrated light source package, wherein the light generating device is attached to the thermally conductive body and/or wherein the thermally conductive body and the and the light generating device are functionally coupled to a common support member. Especially, the one or more luminescent bodies may be attached to the thermally conductive body.

In embodiments, the light conversion system may provide in an operational mode system light comprising the luminescent material light. In specific embodiments, part of the first light may not be converted, may be transmitted by the one or more luminescent bodies, and may propagate together with the luminescent material light, such that in embodiments the system light may comprise the luminescent material light and the first light.

In embodiments, the light conversion system may comprise one or more other light sources, of which the light may in operational modes be comprised by the system light.

Alternatively or additionally, in embodiments the light conversion system may comprises two or more different luminescent materials and two or more different light generating devices, by which the luminescent material light of the two or more different luminescent materials may in operational modes be comprised by the system light.

Hence, in specific embodiments, in operational modes of the system, the system light may be white light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

The terms "visible", "visible light" or "visible emission" and similar terms refer to light having one or more wavelengths in the range of about 380-780 nm. Herein, UV may especially refer to a wavelength selected from the range of 200-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

A control system may be used to control the system light, like e.g. intensity and optionally spectral power distribution.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In yet a further aspect, the invention also provides a lamp or a luminaire comprising the light generating system as defined herein. The luminaire may further comprise a housing, optical elements, louvres, etc. etc. . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a lighting device selected from the group of a lamp, a luminaire, a projector device, a disinfection device, and an optical wireless communication device, comprising the light generating system as defined herein. The lighting device may comprise a housing or a carrier, configured to house or support, one or more elements of the light generating system. For instance, in embodiments the lighting device may comprise a housing or a carrier, configured to house or support one or more of the lights generating device and the thermally conductive body.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1:
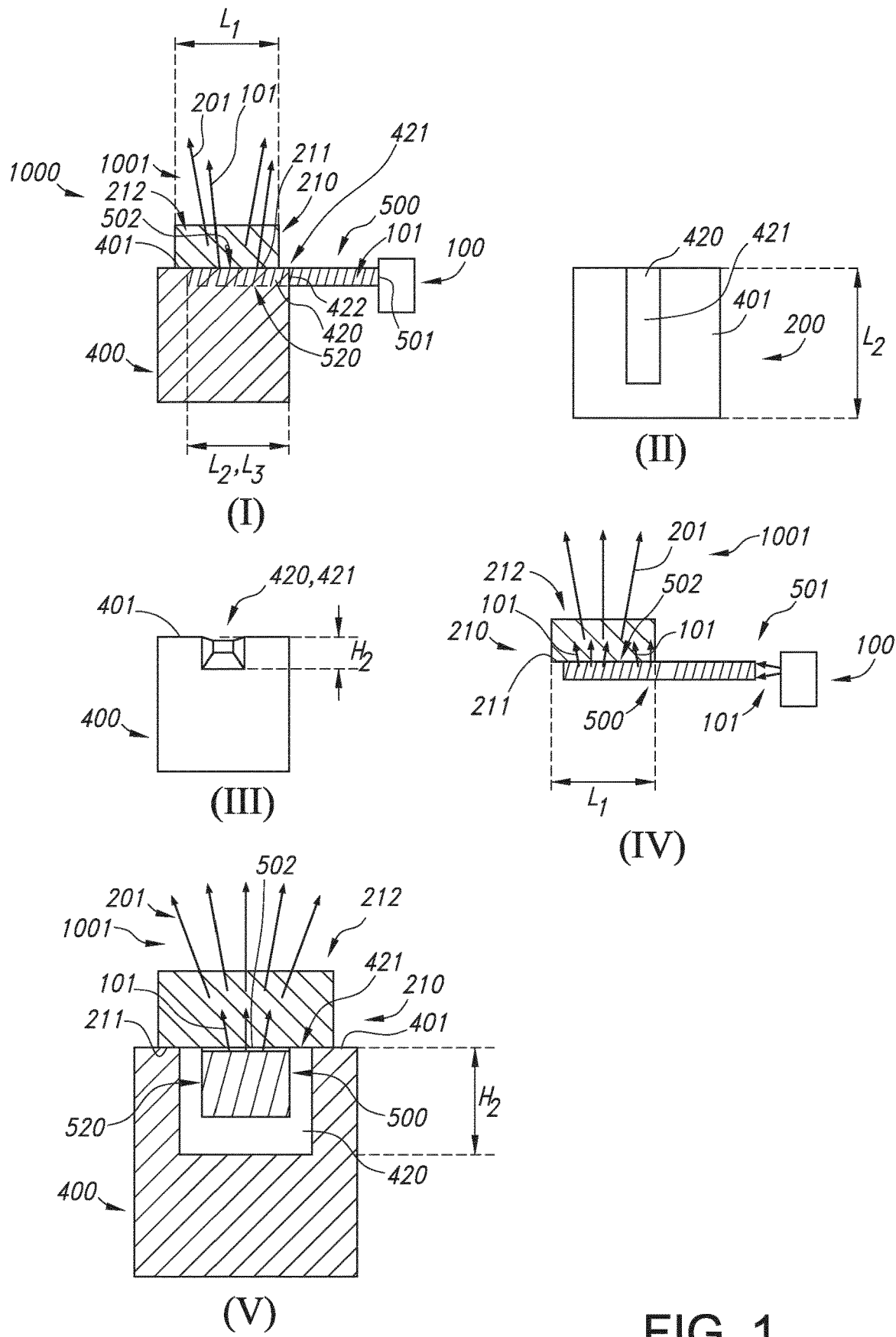
FIG. 1 schematically depict a number of aspects and embodiments.

FIG. 1 schematically depicts different views of an embodiment of a light conversion system 1000. The light conversion system 1000 may comprise (a) one or more luminescent bodies 210, (b) a thermally conductive body 400, and (c) a waveguide element 500. Optionally, as also schematically depicted in FIG. 1, and some of the other drawings, the light conversion system 1000 may also comprise (d) a light generating device 100.

The thermally conductive body 400 may comprise a first reflective face 401, and a first slit 420 in at least part of the first reflective face 401. The first slit 420 may comprise a first slit opening 421.

The waveguide element 500 may comprise a light entrance part 501 and a light exit part 502. At least part of the light exit part 502 may be configured in the first slit 420. Further, the waveguide element 500 may be configured to guide at least part of first light 101 coupled into the waveguide element 500 via the light entrance part 501 to the light exit part 502.

The one or more luminescent bodies 210 may comprise a reflector-directed part 211 and an optical output part 212. Especially, the reflector-directed part 211 may be in thermal contact with at least part of the first reflective face 401. Yet further, especially the reflector-directed part 211 may enclose at least part of the first slit opening 421.

The one or more luminescent bodies 210 may be configured (a) to receive via at least part of the reflector-directed part 211 at least part of the first light 101 escaping from the light exit part 502 of the waveguide element 500 and (b) to convert in a light conversion process at least part of the first light 101 into luminescent material light 201. Especially, at least part of the luminescent material light 201 emanates from the optical output part 212.

In embodiments, the light generating device 100 may be configured to generate the first light 101. Especially, the light generating device 100 may be configured upstream of the light entrance part 501 of the waveguide element 500. In specific embodiments, the light generating device 100 may comprise a solid-state light source.

Referring to FIG. 1, an embodiment is schematically depicted, or parts thereof, in different views. Embodiment I is a possible cross-sectional view of the system 1000. Embodiment II is a possible top view of the thermally conductive body 400, showing the first slit 420. Embodiment III is a possible (perspective) side view of the thermally conductive body 400, also showing the first slit 420. The opening in the slit 420 at the top is indicated with reference 421. The slit 420 is seen in an direction from the second opening (plane of drawing) to the end of the slit (behind the plane of drawing). The side faces and bottom face of the slit may also be reflective, e.g. because the thermally conductive body comprises thermally conductive material that is reflective and/or because a reflective layer has been applied to these faces. Embodiment IV is a cross-sectional view of part of an embodiment of the system 1000, showing the waveguide element 500, the luminescent body 210, and the light generating device 100. Embodiment V is yet another cross-sectional view, e.g. perpendicular to the cross-sectional view of embodiment I.

The one or more luminescent bodies 210 may have a first length L1 defined parallel to the first slit 420. In embodiments, in a projection on the one or more luminescent bodies 210 (at least part of) the light exit part 502 may be configured between 20%-80% of the first length L1.

The first slit 420 may have a second length L2. Especially, the waveguide element 500 may comprise a slit-based part 520, wherein the slit-based part 520 may be configured in the first slit 420. The slit-based part 520 may comprise the light exit part 502. Especially, the slit-based part 520 may have a third length L3. Especially, L3<L2. In embodiments, $0.5 \leq L3/L2 \leq 0.9$.

In specific embodiments, at least one of the one or more luminescent bodies 210 may comprise a ceramic body. Further, in embodiments the thermally conductive body 400 may comprise one or more of a copper body and an aluminum body.

In embodiments, at least one of the one or more luminescent bodies 210 may comprise (a) a luminescent material of the type $A_3B_5O_{12}:Ce^{3+}$, wherein A may comprise one or more of Y, La, Gd, Tb and Lu, and wherein B may comprise one or more of Al, Ga, In and Sc, and/or (b) a luminescent material of the type $A_3Si_6N_{11}:Ce^{3+}$, wherein A may comprise one or more of Y, La, Gd, Tb and Lu (especially wherein A may comprise one or more of La and Y).

In embodiments, the waveguide element 500 may comprise an optical fiber.

In embodiments, the thermally conductive body may comprise a material such as especially Cu. A copper body, coated with a highly reflective layer, may also be possible. Other options could include e.g. Al, SiC, AlN, and other metals or ceramics with high thermal conductivity. A thermally conductive body like a (thin) vapor chamber may also be possible. In other embodiments, a white reflective ceramic material may be applied. For instance, in embodiments boron nitride BN may be applied.

The slit 420 may have a first slit opening 421 at the top and a second slit opening 422 at a side. The waveguide element 500 may in embodiments penetrate the thermally conductive body 400 via the second slit opening.

Device light 101 of the device 100 may enter via the light entrance part 501 of the waveguide element 500 into the waveguide element 500 and escape therefrom via the light exit part 502 (comprised by the slit-based part 520). This light may enter directly or after reflections at the slit faces the luminescent body 210, wherein at least part of this light may be converted into luminescent material light 201. This luminescent material light may be comprised by the system light 1001.

Further referring to embodiment I, but this may also apply to other embodiments, one of the faces of the luminescent body may be the reflector-directed part 211, another one of the faces of the luminescent body may be the optical output part 212. The one or more other available faces of the luminescent body may be provided with a reflector, such as a reflective layer.

Figure 2A:
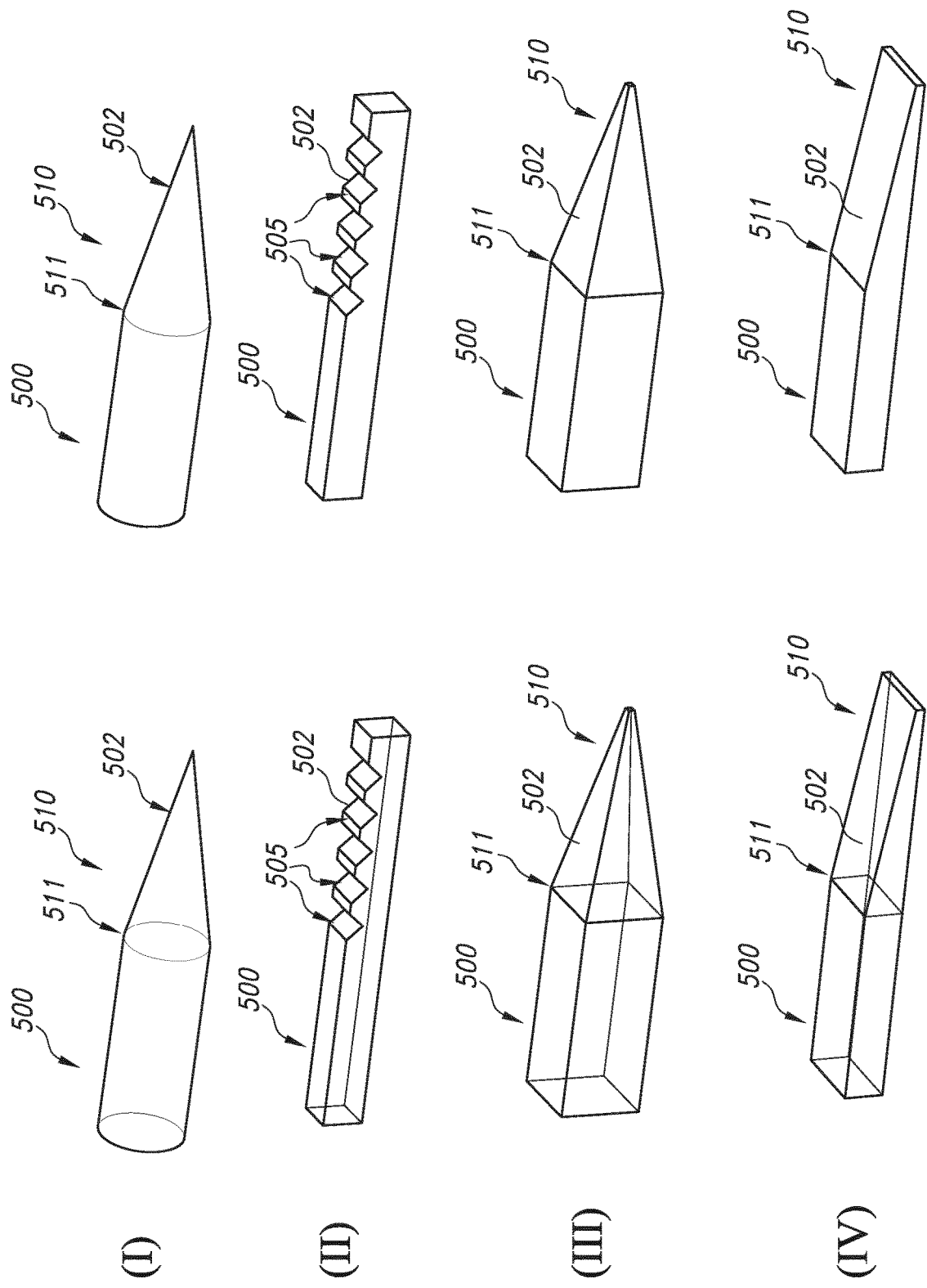
FIGS. 2a-2b schematically depict some embodiments in relation to the waveguide element.

FIG. 2a schematically depict some embodiments of the light exit part 520 of the waveguide element 500 are depicted. The cross section of the waveguide element 500, such as a fiber, can be square (III), rectangular (IV) or circular (I). However, the waveguide element may also have a hexagonal cross-section. Other shapes may also be possible. Alternatively or additionally, the waveguide element 500, such as the fiber, can have other means of light extraction (does not need to be tapered, e.g. scattering fiber at the out-coupling side); or micro-prismatic extraction features (II). Hence, in embodiments the light exit part 502 may comprise light outcoupling structures 505. Hence, the light exit part may comprise in embodiments micro-indentations and/or micro-protrusions.

Figure 2B:
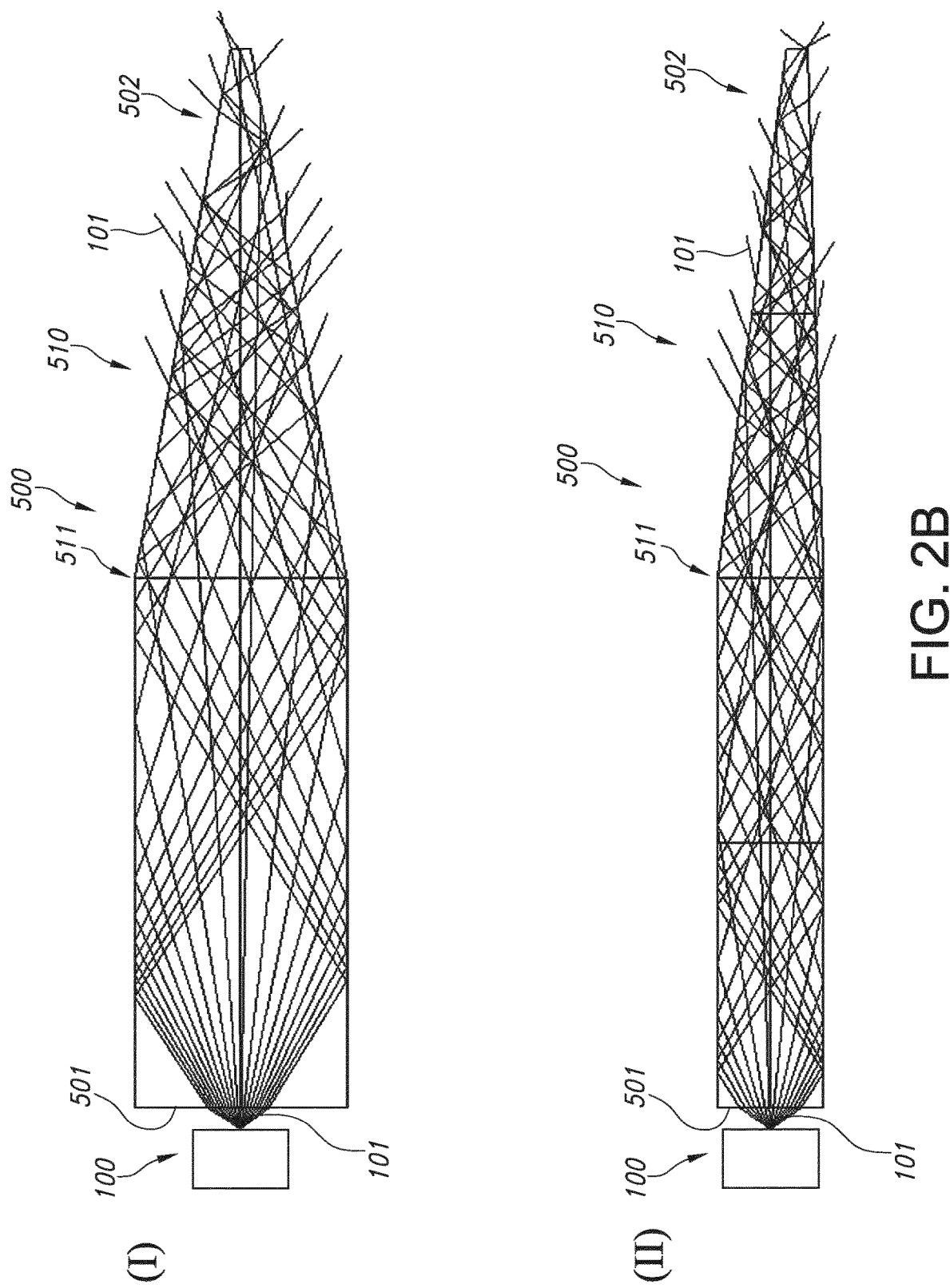

FIG. 2b schematically depict some rays of device light 101 and how they may escape from the tapering part. Due to the tapering essentially total internal reflection is not possible anymore, and light may escape from the tapering part. As schematically depicted, a plurality of reflections in the tapering part 510 may be required to pass the total internal reflection angle and escape from the waveguide element 500. After each reflection from the tapered wall the light direction may be changed. At a subsequent reflection the angle of incidence on the wall may have increased and may surpass the TIR angle and escape from the waveguide element. Hence, this part of the waveguide element is also indicated light exit part 502. Hence, the first part of the tapering part, determined from the onset 511, may not necessarily be configured in the slit. The escape of device light 101 from the first part may be relatively small, and may found e.g. at about 5% from the tapering length determined from the onset 511, such as from about 10% of this length (see also at FIG. 3a). A value of 100% of the tapering length may indicate the length between the onset 511 and the end of the tapering part 510 (here the tip at the right side).

The 501 light entrance part, which is especially a face, may be configured perpendicular to a length axis of the waveguide element 500.

FIGS. 3a-3h schematically depict yet some further embodiments (which will further be elucidated below).

Figure 3A:
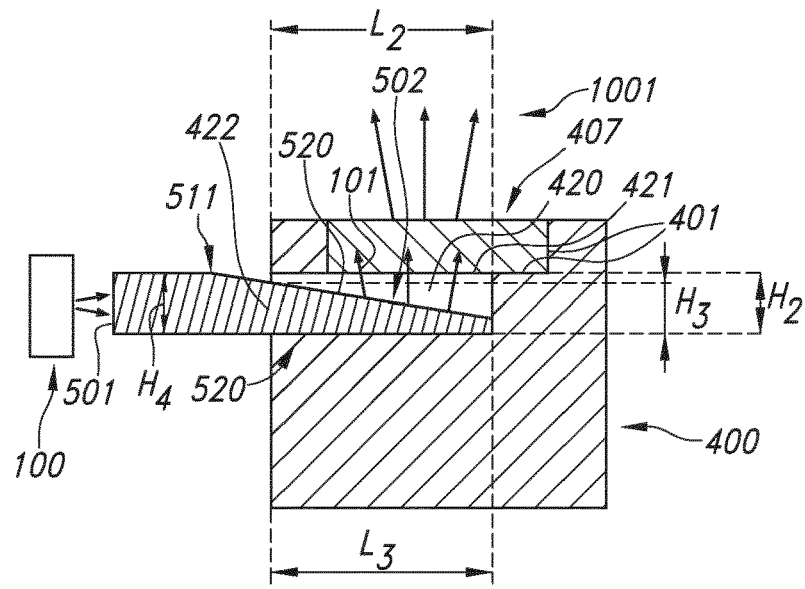
FIGS. 3a-3h schematically depict some further aspects and embodiments.

Referring to FIGS. 1, 2, and 3a, the waveguide element 500 may comprise a tapering part 510. The tapering of the tapering part 510 may be in a direction from external from the first slit 420 to a position in the first slit 420. The light exit part 502 may be comprised by the tapering part 510 (or may be configured downstream of the tapering part 510).

Referring to e.g. FIG. 3a, in embodiments the tapering of the tapering part 510 has an onset 511 external from the first slit 420. Referring to FIG. 2b and FIG. 3a, it is clear that it is not necessary that the entire tapering part 510 is configured in the slit 420. Assuming e.g. a tapering part having a length L4 (not depicted), then the tapering part may be in the range of 50-100% of the length L4 in the slit, like e.g. 60-95%, like 60-80%. The part of the tapering part that may not be configured in the slit is the relatively broadest part, i.e. the 0-40% of L4 calculated from the onset.

The maximum height of the waveguide element 500 in the slit, i.e. the slit-based part 520, is indicated with reference H3. Note that this height may be smaller than the maximum height of the waveguide element 500, which is indicated with reference H4. Hence, H3≤H4. Here, the tapering start external from the slit. Hence, the maximum height H4 of the waveguide element 500 and also be larger than maximum height H3 of the slit-based part 520.

FIG. 3a also schematically depicts an embodiment wherein the reflective face 401 may be part of a recess 407 in the thermally conductive body 400. This recess may be indicated as luminescent body recess. The luminescent body (or bodies) may be configured in the first slit, which may thus be a recess to this (luminescent body) recess.

As indicated above, part of the one or more luminescent bodies may be configured in a recess of the thermally conductive body. However, in such embodiments and in other embodiments, the thermally conductive body may provide a shape having the function of beam shaping the luminescent material light.

Figure 3B:
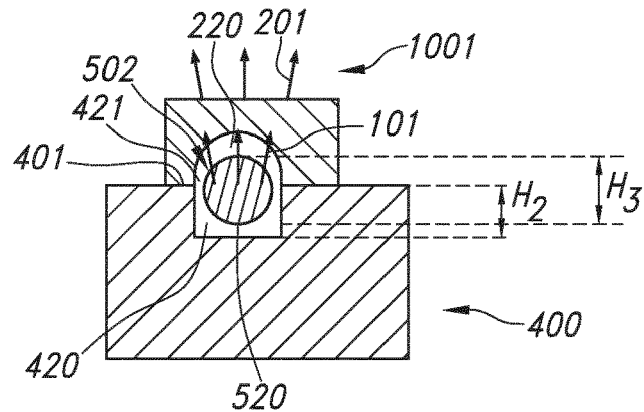
Figure 3C:
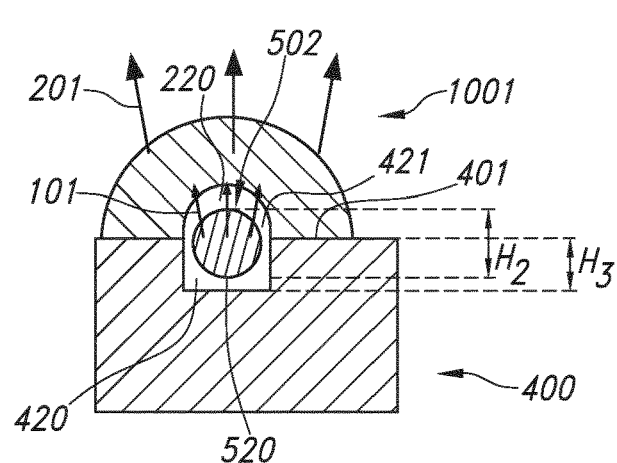

Referring to e.g. FIGS. 3b-3c, but also e.g. to FIG. 1, in embodiments the slit-based part 520 has a maximum height H3, wherein the first slit 420 has a slit height H2, wherein 0.25≤H3/H2≤4. In embodiments wherein H3/H2>1, especially in embodiments the one or more luminescent bodies 210 may provide a second slit 220. In embodiments, the first slit 420 and the second slit 220 together host at least part of the slit-based part 520.

Referring to FIG. 3c, the dashed line could e.g. indicate that there are two luminescent bodies 210 providing the one or more luminescent bodies 210.

Referring e.g. to the embodiment of FIG. 3c, the reflector-directed part 211 may have a first area A1 and the light emitting part 212 has a second area A2. In embodiments, A2>A1. Especially, in embodiments 1.25≤A2/A1≤4.

Figure 3D:
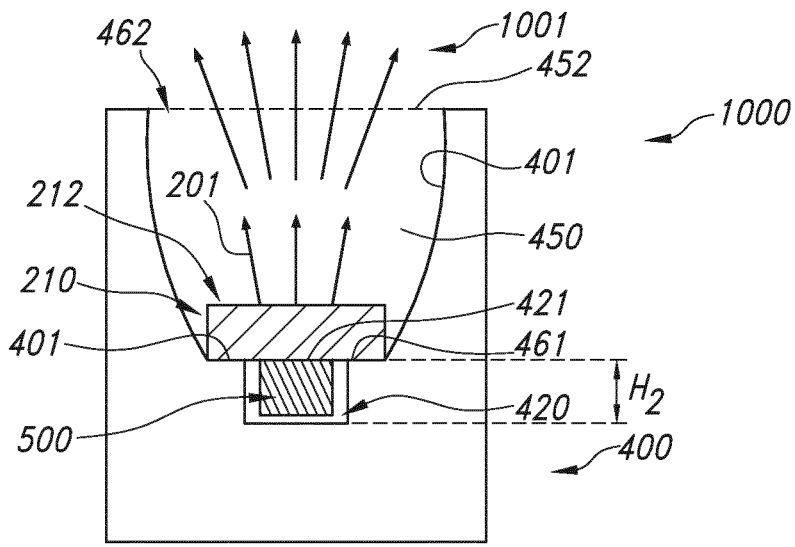
Figure 3E:
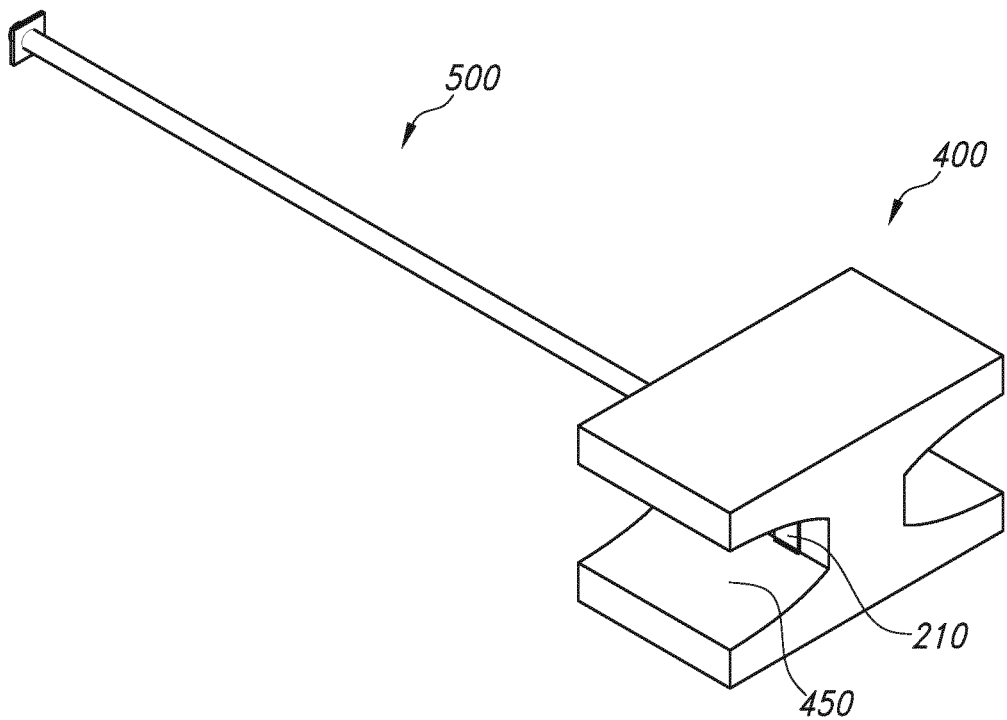
Figure 3F:
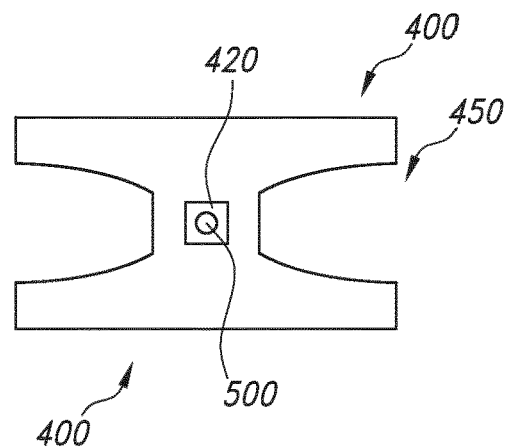

Referring e.g. to FIGS. 3d-3f, the thermally conductive body 400 may be a shaped body, e.g. comprising a reflector cavity 450 having a first reflector end 461 and a second reflector end 462. In embodiments, the reflector cavity 450 may comprise a reflector exit 452 configured at the second reflector end 462. At least part of the optical output part 212 of the one or more luminescent bodies 210 may be configured at the first reflector end 461. Especially, the luminescent body (bodies) 210 may (thus) be configured closer to the first reflector end 461 than to the second reflector end 462. FIG. 3e schematically depicts an embodiment of the luminescent body 210 having a rectangular cross-section.

With respect to FIG. 3d, it is noted that the luminescent body 210 comprise a reflector-directed part 211, which is configured in thermal contact, such as physical contact, with the thermally conductive body 400, and an optical output part 212. Especially, the reflector-directed part 211 may enclose at least part of the first slit opening 421. The luminescent body 210 is configured to receive via at least part of the reflector-directed part 211 at least part of the first light 101 escaping from the light exit part 502 of the waveguide element 500 and to convert in a light conversion process at least part of the first light 101 into luminescent material light 201. At least part of the luminescent material light 201 emanates from the optical output part 212. Note that part of this light may in this embodiment (and other embodiments) also be reflected by the thermally conductive body 400, as the thermally conductive body may thus comprise the reflector cavity 450 wherein the luminescent body 210 may be configured. Hence, even though luminescent material light 201 from other parts than the reflector-directed part may also irradiate the reflective thermally conductive body 400 in specific embodiments, such other parts are not indicated as reflector directed part 211. Such part(s) may thus be indicated as optical output part 212, as effectively from such part(s) luminescent material light 201 may effectively escape from the luminescent body 210, (without (in average) a substantial change to be reflected back into the luminescent body 210). As indicated above, the term "reflector-directed part" may especially be used for that part of the luminescent body that is in thermal contact with the thermally conductive body 400.

Figure 3G:
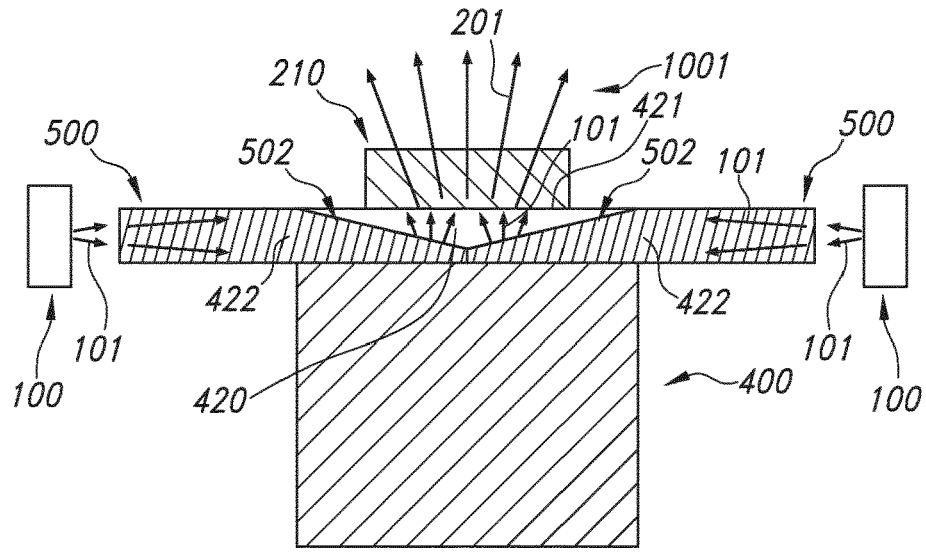
Figure 3H:
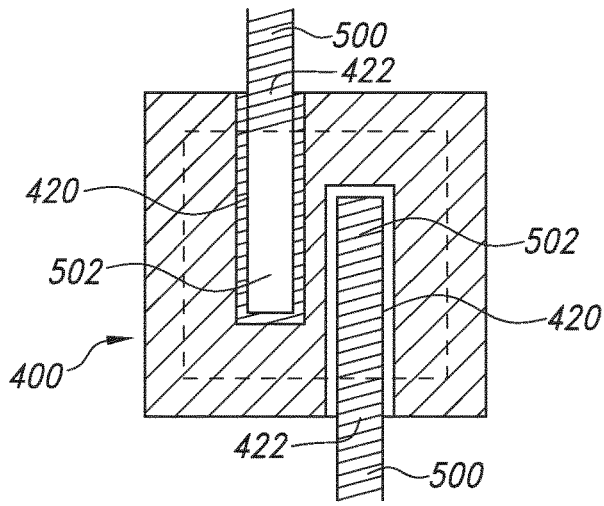

Referring to FIGS. 3g-3h, the light conversion system 1000 may comprise two or more waveguide elements 500. Further, the thermally conductive body 400 may comprise one or more of the first slits 420 in at least part of the first reflective face 401. In specific embodiments, each first slit 420 hosts one or two light exit parts 502 of one or two respective waveguide elements. The dashed square in FIG. 3h indicates the one or more luminescent bodies. Note that this embodiment comprises two first slits 420, each comprising a first slit opening 421 and a second slit opening 422.

Figure 4:
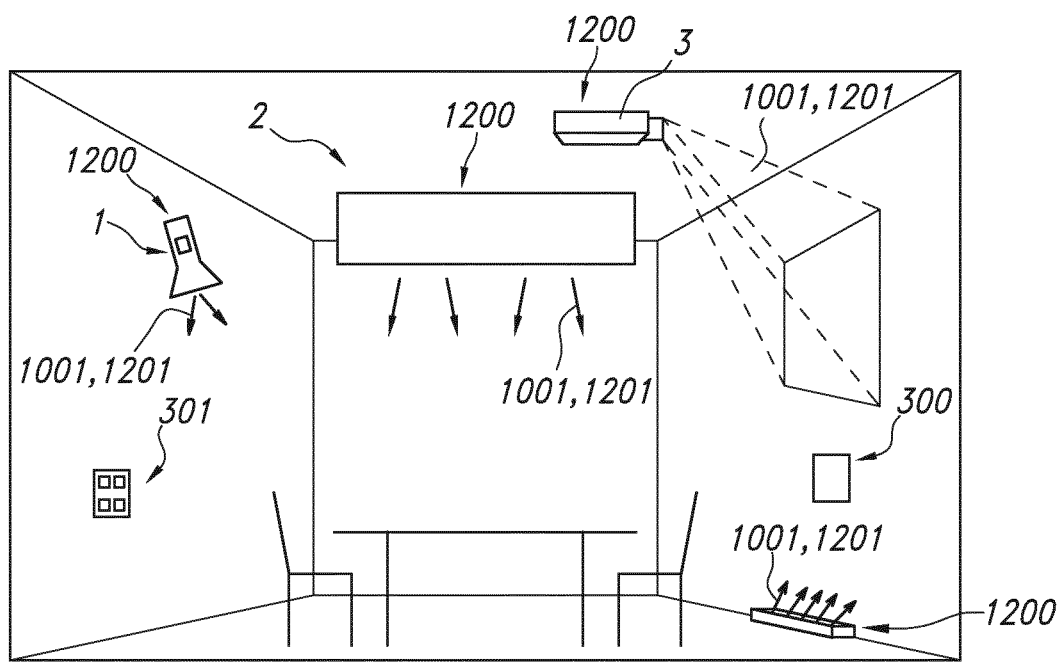
FIG. 4 schematically depict some application embodiments. The schematic drawings are not necessarily to scale.

FIG. 4 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 4 schematically depicts embodiments of a lighting device 1200 selected from the group of a lamp 1, a luminaire 2, a projector device 3, a disinfection device, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001.

In laser-based lighting a ceramic phosphor may be pumped by the light of one or more blue laser diodes. The phosphor can convert high power densities of pump light, provided that there may be adequate heat management. Two configurations for mounting and irradiating the phosphor may exist: a reflective and a transmissive configuration. In a reflective configuration the phosphor may be attached to a reflective heat spreader (or heat sink), ensuring an effective thermal path for the (Stokes) losses. However, the converted light may be emitted in the direction where the pump light comes from and this requires relatively complicated optics to ensure a high collection efficiency and good spectral separation. In a transmissive configuration the phosphor may be irradiated from the back and the converted light may be collected from the front, using relatively simple collection optics. However, the transmissive phosphor cannot have a very effective thermal path as this may block the light. Hence the transmissive configuration may have limited pump power densities. Also, part of the converted light may be emitted to the back and might not be collected efficiently.

Several options may exist to irradiate the phosphor with the blue laser diode pump light. Using a focusing lens or mirror might be blocking the collection of converted light in a reflective configuration. The same holds for directly shining with the laser onto the phosphor from a short distance. Delivering the pump light with a thin optical fiber may enable compact solutions compared to lenses or mirrors but may be relatively unexplored.

Hence, it appears that there may be a need for a compact transmissive configuration, having efficient collection optics for light from the front- and the backside, with improved heat removal from the phosphor, comparable to a reflective configuration.

In embodiments, a ceramic phosphor element may be pumped from the back using a tapered fiber. The phosphor element may be advantageously attached to a reflective heat spreader (or heat sink) for improved thermal management. The heat spreader (or heat sink) may comprise a narrow slit in which the tapered end of a fiber may be mounted. The pump laser light from the fiber exits from the tapered end. The slit in the reflective heat spreader (or heat sink) acts as a mixing cavity to improve uniform spreading of the pump light over the back surface of the phosphor. When light may be injected into the fiber (not shown) it will be squeezed out by the tapered end. The exact shape of the taper (linear or curved or corrugated or else) may affect the light distribution of the exiting light and can be tuned to guarantee a uniform irradiation of the phosphor. In embodiments, a heat spreader (or heat sink) with a narrow slit may accommodates the tapered fiber end. The heat spreader (or heat sink) may be optically highly reflecting and thermally highly conductive. On the bottom left the ceramic phosphor may be shown, soldered or otherwise attached to the heat spreader (or heat sink) and covering the slit and the tapered fiber. The pump light from the fiber enters the back side of the phosphor, and the converted light can escape all surfaces of the phosphor. Converted light exiting from the back of the phosphor may be reflected by the heat spreader (or heat sink) towards the top. Optionally, in embodiments the one or more sides (or faces) of the luminescent body (bodies) are made reflective, either by mirror coating or by applying other light reflective material to the phosphor sides (like white diffuse scattering materials, e.g. white ceramics or reflective compositions of particles in (silicone) matrix) to force all light to exit from the top surface only. Finally on the bottom right some result of an optical simulation may be shown where rays of converted and pump light are seen to exit from the phosphor. Other reflective coatings are also described above, e.g. in relation to the reflective coating that may (also) be available on the thermally conductive body.

Several simulations were executed.

Part of the (blue) pump light may be transmitted (unconverted) and may mix with the converted light to white with a CCT of around 5800-6000K in an example. The exact value can easily be adjusted by the Ce concentration and the degree of scattering in the phosphor. The coating of the slit in the heat spreader (or heat sink) may have some effect on the uniformity of the light.

A mirror coating or a diffusely scattering (Lambertian) one were applied in the simulations. The latter may have a slightly more uniform spatial light distribution. Also, the exact position of the tapered fiber end inside the slit and the exact shape of the slit walls may have impact on the distribution (not shown) and can be optimized for improved uniformity. The optical model predicts an output radiation of 0.51-0.58 W for 1 W of pump radiation, an efficiency of 51-58%.

To get some quantitative insight in the thermal behavior of the proposed configuration a thermal model has been explored. In the thermal model, the bottom face of the heat spreader (or heat sink) may be in each case assumed to be appropriately cooled, e.g. by a heat sink, and kept at constant temperature. First the effect of a slot in the Al heat spreader (or heat sink) may be investigated. With modelled phosphor dimensions of 0.6×0.4×0.2 $mm^3$, a heat load of P=1 W may be assumed to be localized in 0.4×0.2×0.2 $mm^3$ region above the fiber slot, and the contact area of the phosphor with the heat spreader (or heat sink) may be 0.24 $mm^2$. This heat load value corresponds to about 15 $W/mm^2$ optical pump power density which may be the practical limit that was achieved in the past for a transmissive phosphor on sapphire heat spreader (or heat sink) configuration. The maximum phosphor temperature will rise to 119 K above ambient per W of thermal dissipated power, R=119 K/W, which may be well below the quenching temperature of the ceramic phosphor. With a slot in the heat spreader, or heat sink, the contact area of course diminishes, in this example to 0.18 $mm^2$, and R increases to 146 K/W. The contact area can be increased by using the side walls of the phosphor. Now R decreases to 90 K/W for an Al heat spreader (or heat sink), 84 K/W if made from Cu and 81 K/W using a vapor chamber heat sink.

Heat can be also removed from the phosphor via its side facets. This may have the advantage as described that the maximum temperature rise of the phosphor may be reduced from about 146 K/W to 90 K/W.

A cylindrical phosphor configuration may be illustrated in 3c. Taking the same phosphor volume as used above in relation to the rectangular shapes, but shaping it in a cylinder form results in a larger contact surface of 0.31 $mm^2$, and a temperature rise of 100 K/W. The projected emitting surface of the rectangular tile equals 0.24 $mm^2$, and of the cylinder it may be a comparable 0.28 $mm^2$. An advantage may be that the optical path from the fiber to the air may be constant for the cylinder shape whereas it varies for the rectangular phosphor shape. This may lead to some positional dependence of color.

The contact area with the heat spreader (or heat sink) can be further enlarged by the configuration, where a cylindrical phosphor shape may be clamped from two sides by the heat spreader (or heat sink). The temperature rise of the phosphor may in embodiments be only 41K/W in this case, due to the larger contact area.

The heat spreader (or heat sink) can be shaped as an optically useful shape, e.g. as a Compound Parabolic Concentrator (CPC) collimator, a parabolic or elliptical reflector. This may be illustrated in FIGS. 3d-3f. A rectangularly shaped phosphor may be clamped in a heat spreader (or heat sink) from 4 of its 6 sides. A cylindrical hole may be provided where a tapered end of a fiber may be inserted. The converted and unconverted light can exit the phosphor on two sides, which are at the entrance of the linear CPC collimators. The advantage of the extruded CPC over s square CPC may be easier manufacturing of the CPC. The advantage of the square CPC may be the more useful beam shape, requiring no further optics to collimate the light in the length direction.

In embodiments, the cross section of the fiber can be square, rectangular or circular. In embodiments, the fiber can have other means of light extraction than being tapered, e.g. scattering fiber at the out-coupling side). In embodiments, the phosphor surface in the slit area can be non-flat, e.g. curved or structured, to help spreading of pump light to larger exit area of a phosphor. In embodiments, the fiber in its outcoupling part can form a solid body with a phosphor (e.g. meted in or co-sintered). In embodiments, the heat spreaders (or heat sinks) can be made in multiple parts, such as two parts to clamp the phosphor, which may be easier to assemble. In embodiments, a larger heat spreader (or heat sink) with multiple slots for multiple fibers and phosphors may be possible. Multiple fibers can be combined in a single fiber bundle; a higher power from multiple fibers and/or a better uniformity of pumping may be obtained. In embodiments, the slit in the heat spreader (or heat sink) may match the shape of the tapered fiber. This may allow a larger contact area of phosphor with heat spreader (or heat sink). In embodiments, the phosphor may have a flattened cylindrical shape. This may provide a larger contact area of phosphor with heat spreader (or heat sink). In embodiments, the phosphor element may consist of two parts instead of single part with a hole. This may provide a less complex manufacturing of phosphor element.

In specific embodiments, a ceramic phosphor element may be pumped from the back by light coupled out at the side of a tapered fiber. The phosphor element may be advantageously attached to a reflective heat spreader (or heat sink), and optionally to the tapered fiber which may in turn be attached to the reflective heat spreader (or heat sink) as well, for improved thermal management. The tapered fiber preferably may have one or more flat surfaces for light extraction or reflection. The heat spreader (or heat sink) may comprise a narrow slit in which the tapered end of a fiber may be mounted. The pump laser light from the fiber exits from the tapered end. The slit acts as a mixing cavity to improve uniform spreading of the pump light over the back surface of the phosphor. Alternatively, the slit matches the shape of the tapered fiber. In an embodiment, the tapered fiber may be arranged between two ceramic phosphor elements. The ceramic phosphor element may have a flattened cylindrical shape.

FIG. 4 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 5 also schematically depicts an embodiment of lamp 1 comprising the light generating system 1000. Reference 3 indicates a projector device or projector system, which may be used to project images, such as at a wall, which may also comprise the light generating system 1000.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light conversion system comprising (a) one or more luminescent bodies, (b) a thermally conductive body, (c) a waveguide element, and (d) a light generating device, wherein:
the thermally conductive body comprises a first reflective face, and a first slit in at least part of the first reflective face, wherein the first slit comprises a first slit opening;
the waveguide element comprises a light entrance part and a light exit part, wherein at least part of the light exit part is configured in the first slit; wherein the waveguide element is configured to guide at least part of first light coupled into the waveguide element via the light entrance part to the light exit part;
the one or more luminescent bodies comprise a reflector-directed part and an optical output part; wherein the reflector-directed part is in thermal contact with at least part of the first reflective face and wherein the reflector-directed part encloses at least part of the first slit opening; wherein the one or more luminescent bodies are configured (a) to receive via at least part of the reflector-directed part at least part of the first light escaping from the light exit part of the waveguide element and (b) to convert in a light conversion process at least part of the first light into luminescent material light, wherein at least part of the luminescent material light emanates from the optical output part; and
the light generating device is configured to generate the first light, wherein the light generating device is configured upstream of the light entrance part of the waveguide element; and wherein the light generating device comprises a solid-state light source; and
wherein the waveguide element comprises a tapering part, wherein the tapering of the tapering part is in a direction from external from the first slit to a position in the first slit, wherein the light exit part is comprised by the tapering part or is configured downstream of the tapering part.

2. The light conversion system according to claim 1, wherein the tapering of the tapering part has an onset external from the first slit.

3. The light conversion system according to claim 1, wherein the light exit part comprises light outcoupling structures.

4. The light conversion system according to claim 1, wherein the one or more luminescent bodies have a first length defined parallel to the first slit, wherein in a projection on the one or more luminescent bodies the light exit part is configured between 20%-80% of the first length.

5. The light conversion system according to claim 1, wherein the first slit has a second length, wherein the waveguide element comprises a slit-based part, wherein the slit-based part is configured in the first slit, wherein the slit-based part comprises the light exit part, wherein the slit-based part has a third length, wherein $0.5 \leq L3/L2 \leq 0.9$.

6. The light conversion system according to claim 5, wherein the slit-based part has a maximum height, wherein the first slit has a slit height, wherein $0.25 \leq H3/H2 \leq 4$.

7. The light conversion system according to claim 6, wherein $H3/H2 > 1$, wherein the one or more luminescent bodies provide a second slit, wherein the first slit and the second slit together host at least part of the slit-based part.

8. The light conversion system according to claim 1, wherein the reflector-directed part has a first area A1 and wherein the light emitting part has a second area A2, wherein A2>A1.

9. The light conversion system according to claim 1, wherein the thermally conductive body is a shaped body comprising a reflector cavity having a first reflector end and a second reflector end, wherein the reflector cavity comprises a reflector exit configured at the second reflector end, and wherein at least part of the optical output part of the one or more luminescent bodies is configured at the first reflector end.

10. The light conversion system according to claim 1, wherein at least one of the one or more luminescent bodies comprises a ceramic body; wherein the thermally conductive body comprises one or more of a copper body and an aluminum body; and wherein the thermally conductive body comprises one or more of a heatsink and a heat spreader.

11. The light conversion system according to claim 1, wherein at least one of the one or more luminescent bodies comprises (a) a luminescent material of the type $A_3B_5O_{12}$:Ce, wherein A comprises one or more of Y, La, Gd, Tb and Lu, and wherein B comprises one or more of Al, Ga, In and Sc, and/or (b) a luminescent material of the type $A_3Si_6N_{11}$:$Ce^{3+}$, wherein A comprises one or more of Y, La, Gd, Tb and Lu.

12. The light conversion system according to claim 1, wherein the waveguide element comprises an optical fiber.

13. The light conversion system according to claim 1, comprising two or more waveguide elements, wherein the thermally conductive body comprises one or more of the first slits in at least part of the first reflective face, and wherein each first slit hosts one or two light exit parts of one or two respective waveguide elements.

14. A lighting device selected from the group of a lamp (1), a luminaire (2), a projector device (3), a disinfection device, and an optical wireless communication device, comprising the light conversion system according to claim 1.

* * * * *